June 20, 1967  F. J. McCOLLEGAN  3,326,259
TIRE COVERS

Filed June 15, 1965  2 Sheets-Sheet 1

INVENTOR
FRED J. McCOLLEGAN
BY
*Alfred W. Perchaft*
ATTORNEY

June 20, 1967  F. J. McCOLLEGAN  3,326,259
TIRE COVERS

Filed June 15, 1965  2 Sheets-Sheet 2

INVENTOR
FRED J. McCOLLEGAN
BY
*Alfred W. Petchaft*

ATTORNEY

United States Patent Office 3,326,259
Patented June 20, 1967

3,326,259
TIRE COVERS
Fred J. McCollegan, 2252 Lee St.,
Granite City, Ill. 62040
Filed June 15, 1965, Ser. No. 464,114
12 Claims. (Cl. 150—52)

This invention relates in general to certain new and useful improvements in tire covers and more particularly to a tire cover for tires mounted on vehicles in storage.

The Armed Forces as well as many large industrial firms often find it necessary to store wheeled vehicles outdoors for several years before they are put in use. This is especially true of the United States Army which maintains large supply depots throughout the United States and overseas. The vehicles after being driven into and parked within the storage area, are jacked up and set on blocks. Over the course of many months and due to constant exposure to the weather the tires deteriorate and become non-serviceable.

It is therefore the primary object of the present invention to provide a tire cover for vehicular tires which reduces deterioration and protects the tire from the elements.

It is another object of the present invention to provide a tire cover of the type stated which is easily installed on tires mounted on wheeled vehicles such as large trucks, truck mounted cranes, trailers, wreckers, and truck mounted compressors.

It is a further object of the present invention to provide a tire cover of the type stated which is relatively simple in construction and economical to manufacture.

With the above and other objects in view, my invention resides in the novel features of form, construction, arrangement, and combination of parts presently described and pointed out in the claims.

In the accompanying drawings—

FIG. 1 is a perspective view, partially broken away, of a tire cover constructed in accordance with and embodying the present invention;

FIGS. 2, 3, and 4 are fragmentary sectional views taken along lines 2—2, 3—3, and 4—4, respectively, of FIG. 1;

Figure 1:
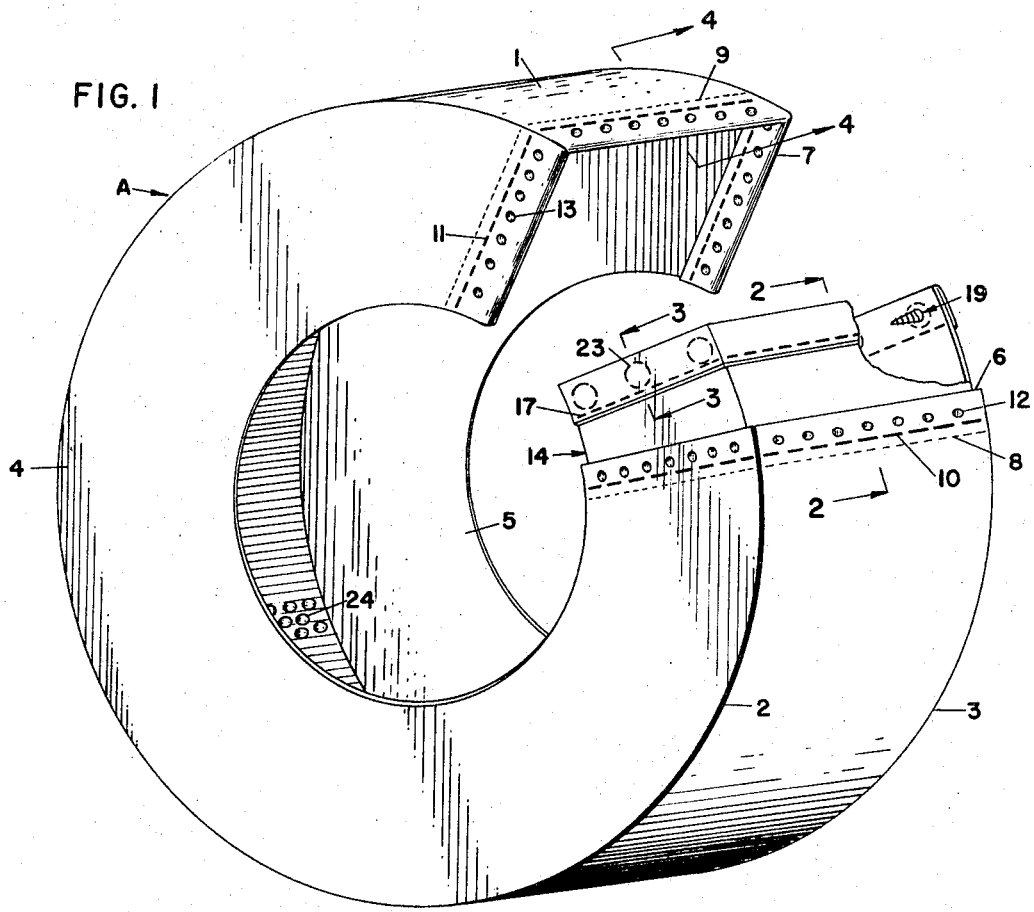

Referring now in more detail and by reference characters to the drawings which illustrate a preferred embodiment of the present invention, A designates a tire cover including a center portion 1 which is sewed or otherwise joined at its transverse margins 2, 3, to substantially annular side walls 4 and 5. Center portion 1 and side walls 4 and 5 are fabricated from a treated waterproof fabric or other suitable flexible waterproof material to conform to the size and shape of a vehicular tire T and, in effect, conjointly form a cover portion which covers the side walls and tread of tire T. Center portion 1 and side walls 4, 5, furthermore are folded inwardly at their ends in the formation of end margins 6, 7 and folds 8, 9. Folds 8, 9 are sewed or otherwise secured to the center portion 1 and side walls 4, 5 along seams 10, 11, which are parallel to the end margins 6, 7, respectively.

Intermediate the end margin 6 and seam 10, the fold 8 and the center portion 1 and side walls 4, 5 are provided with a plurality of metal or synthetic resin grommets 12. Similarly, intermediate the end margin 7 and seam 11, the fold 9 and the center portion 1 and side walls 4, 5 are provided with a plurality of metal or synthetic resin grommets 13.

Secured to the inner faces of center portion 1 and side walls 4, 5 along the seam 10 and projecting peripherally beyond the end margin 6 is a tongue 14 which is folded over on itself in the formation of an end margin 15 and fold 16, the end margin 15 being in spaced parallel relation to the end margin 6. Fold 16 is sewed or otherwise securely fastened to the tongue 14 along a seam 17 which is parallel to the end margin 15. Intermediate the end margin 15 and seam 17 the tongue 14 is provided with a plurality of metal or synthetic resin grommets 18 which accept fasteners 19.

Figures 3, 4:
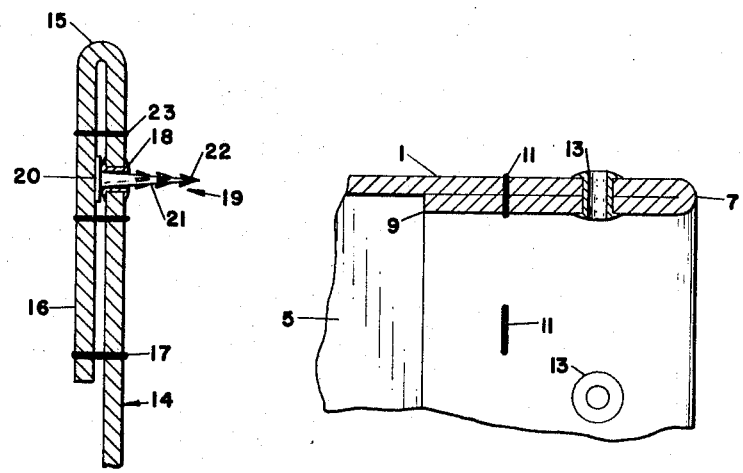

Each fastener 19 includes a circular head 20 which is diametrally greater in size than the internal diameter of grommets 18. Axially projecting from the head 20 is a pointed shank 21 having a plurality of rearwardly extending serrations or barbs 22. As will be seen by reference to FIG. 3, the shank 21 fits through the grommets 18 and projects inwardly beyond the inner face of tongue 18, all for purposes presently more fully appearing. The fold 16 and tongue 15 are further joined together along seams 23 which surround the grommets 18 and prevent the fasteners 19 from falling out or otherwise being displaced.

Disposed diametrically opposite the tongue 14, that is to say half way between end margins 6 and 7, in center portion 1 are a plurality of weep holes 24. Provided for alternate insertion through grommets 12, 13, as will presently be described in greater detail, is a lace 25.

Figure 5:
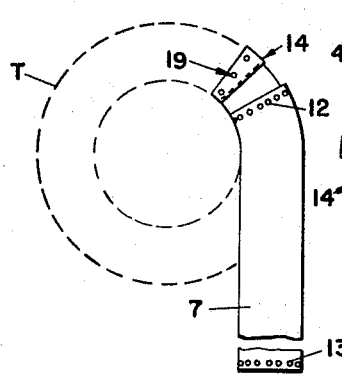
FIG. 5 is a fragmentary side elevational view showing a tire cover temporarily suspended on a tire by the fasteners.
Figure 6:
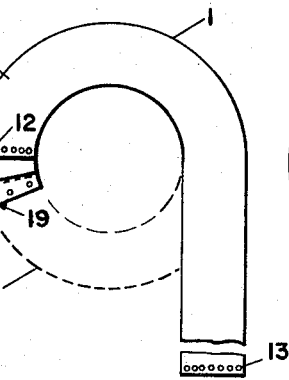
FIG. 6 is a fragmentary side elevational view of a tire cover showing it being installed on a tire.
Figure 7:
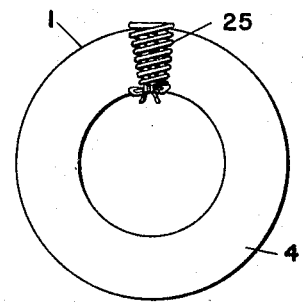
FIG. 7 is a side elevational view of a tire cover operatively installed on a tire.
Figure 2:
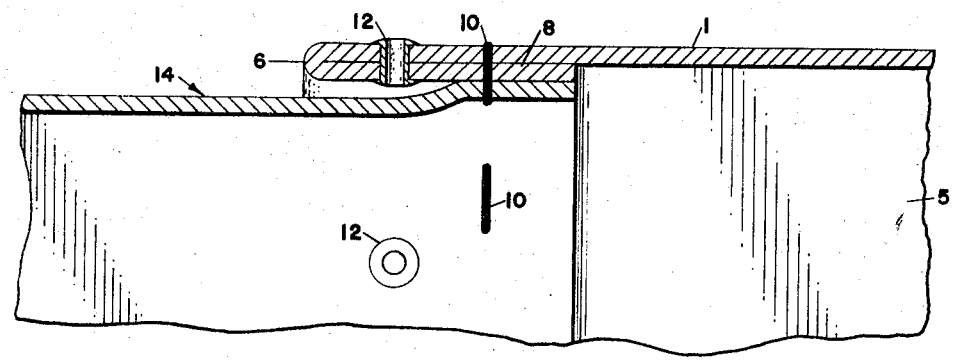

In installing the tire cover A on a vehicular tire T, the tongue 14 is placed over the top of the tire T while the rest of the cover A dangles down and around it, all as best seen in FIG. 5. The tongue 14 is secured to the tire T by pressing the fasteners 19 into the sidewalls thereof. The serrations 22 prevent the fasteners 19 from working loose. Since the shank 21 of fastener 19 is comparatively short and the tread and walls of tire T are relatively thick, the insertion of shank 21 therein amounts nothing more than a pin prick in the surface layer of the rubber and does not in any way weaken or puncture the side wall thereof. As best seen in FIG. 6, the tire T is then slowly rotated while the center portion 1 is smoothed out over the traction surface of tire T and the side walls 4, 5 are simultaneously smoothed out against their corresponding tire side walls. When the tire T has rotated through substantially one revolution the end margin 7 will be disposed over the tongue 14 in proximity to the end margin 6, as illustrated in FIG. 6.

Lace 25 is then laced alternately through the grommets 12, 13 and pulled tight drawing the end margins 6 and 7 together and securely holding the tire cover A on the tire T.

It should be noted that tongue 14 not only presents a convenient method of temporarily fasening the tire cover A to tire T, but also serves as a protective element for protecting that portion of the tire between the end margins 6, 7. The weep holes 24, being disposed at the bottom of tire cover A when it is operatively emplaced, will allow any water which may find its way into the inner portion of the cover A to drain.

It should further be noted that tire cover A can be constructed in varying sizes to accommodate tires of different widths and diameters. Moreover, it can easily be fabricated in a double or side-by-side version to accommodate dual tire mountings.

It should be understood that changes and modifications in the form, construction, arrangement and combination of the several parts of the tire covers may be made and substituted for those herein shown and described without departing from the nature and principle of my invention.

Having thus described my invention, what I claim and desire to secure by Letters Patent is:

1. A tire cover for installation on a vehicular tire; said cover comprising a center portion having transverse margins which are joined to side walls, said center portion and side walls having two common end margins, a tongue extending peripherally beyond one of said end margins, and fastening means permanently carried by the tongue and adapted to directly engage the tire for temporarily holding said tongue to the tire while said tire cover is being installed.

2. A tire cover for installation on a vehicular tire; said cover comprising a cover portion terminating at transversely extending end margins, a tongue secured to the inwardly presented surface of the cover portion and extending peripherally beyond one of said end margins, fastening means for temporarily holding said tongue to the tire while said tire cover is being installed thereon and securing means for drawing one end margin toward the other during installation and for holding said end margins in close proximity after said tire cover has been installed on the tire.

3. A tire cover for installation on a vehicular tire by using a plurality of fasteners each having an enlarged head and serrated shank, said tire cover comprising a center portion having transverse margins which are joined to side walls, said center portion and side walls having two common end margins, and a tongue secured to the inner faces of said center portion and side walls in close proximity to one of said end margins and having a plurality of apertures disposed therein for accepting the shank of a fastener which is adapted to extend therethrough and into the tire whereby to temporarily hold a portion of the cover on the tire.

4. A tire cover for installation on a vehicular tire by using a plurality of fasteners each having an enlarged head and serrated shank, said tire cover comprising a center portion having transverse margins which are joined to side walls, said center portion and side walls having two common end margins, and a tongue secured to the inner faces of said center portion and side walls in close proximity to one of said end margins and having a plurality of apertures disposed therein for accepting the shank of a fastener which is adapted to extend therethrough and into the tire whereby to temporarily hold a portion of the cover on the tire, said center portion and side walls being further provided in close proximity to said side margins with a plurality of apertures adapted to receive the lace for drawing said end margins together during installation and for holding said end margins in close proximity over extended periods after said tire cover has been installed on the tire.

5. A tire cover for installation on a vehicular tire; said tire cover comprising a cover portion adapted to fit against and cover the exposed side walls and tread of the vehicular tire, the cover portion having end margins which are located in close proximity to one another when the cover portion is on the tire, securing means for engaging the cover portion and holding its end margins in fixed relation to one another on the tire, and fastening means adapted to directly engage the tire only and hold one end of the cover portion against the tire so that when the tire is rotated the cover portion will be drawn over the tire into covering relation with respect to the side walls and tread thereof.

6. A tire cover according to claim 5 wherein the fastening means include pointed pins which are inserted into the tire.

7. A tire cover according to claim 6 wherein the pointed pins are permanently attached to the tire cover whereby they cannot be misplaced.

8. A tire cover for installation on a vehicular tire; said tire cover comprising a cover portion adapted to fit against and cover the exposed side walls and tread of the vehicular tire, the tire cover having end margins which are located in circumferentially spaced but close proximity to one another when the cover is on the tire, a tongue secured to the inwardly presented surface of the cover portion and extending beyond one of the end margins a distance greater than the circumferential distance between the end margins whereby to cover the area intermediate the end margins, fasteners adapted to engage the tire only for attaching the tongue to the tire so that when the tire is rotated the cover portion will be drawn over the tire into covering relation with respect to the side walls and tread thereof, and securing means for drawing the end margins of the cover portion toward one another so as to retain the cover portion securely on the tire.

9. A tire cover according to claim 8 wherein the fasteners are pins having pointed ends and enlarged heads, the pins extending through apertures in the tongue and into the tire whereby to affix the tongue to the tire.

10. A tire cover according to claim 9 wherein the portion of the tongue located beyond the apertures is folded back across the apertures and heads of the pins and secured to the unfolded portion of the tongue, whereby the pins are permanently retained on the tongue and cannot be misplaced.

11. A tire cover according to claim 10 in which the securing means comprises a lace which extends through a plurality of transversely spaced apertures located in the cover portion slightly inwardly from the end margins thereof.

12. A tire cover according to claim 5 in which the center portion is provided with apertures adapted to permit water to drain out of the cover.

References Cited

UNITED STATES PATENTS

| | | | |
|---|---|---|---|
| 496,909 | 5/1893 | Shank | 152—186 |
| 1,211,377 | 1/1917 | Draver | 150—54 |
| 2,022,131 | 11/1935 | Lyon | 150—54 |

FOREIGN PATENTS

| | | |
|---|---|---|
| 7,513 | 3/1912 | Great Britain. |
| 19,925 | 10/1905 | Great Britain. |

FRANKLIN T. GARRETT, *Primary Examiner.*